H. A. HOKE.
LOCOMOTIVE GATE VALVE BETWEEN CYLINDER AND SADDLE.
APPLICATION FILED NOV. 10, 1911.
1,050,024.
Patented Jan. 7, 1913.
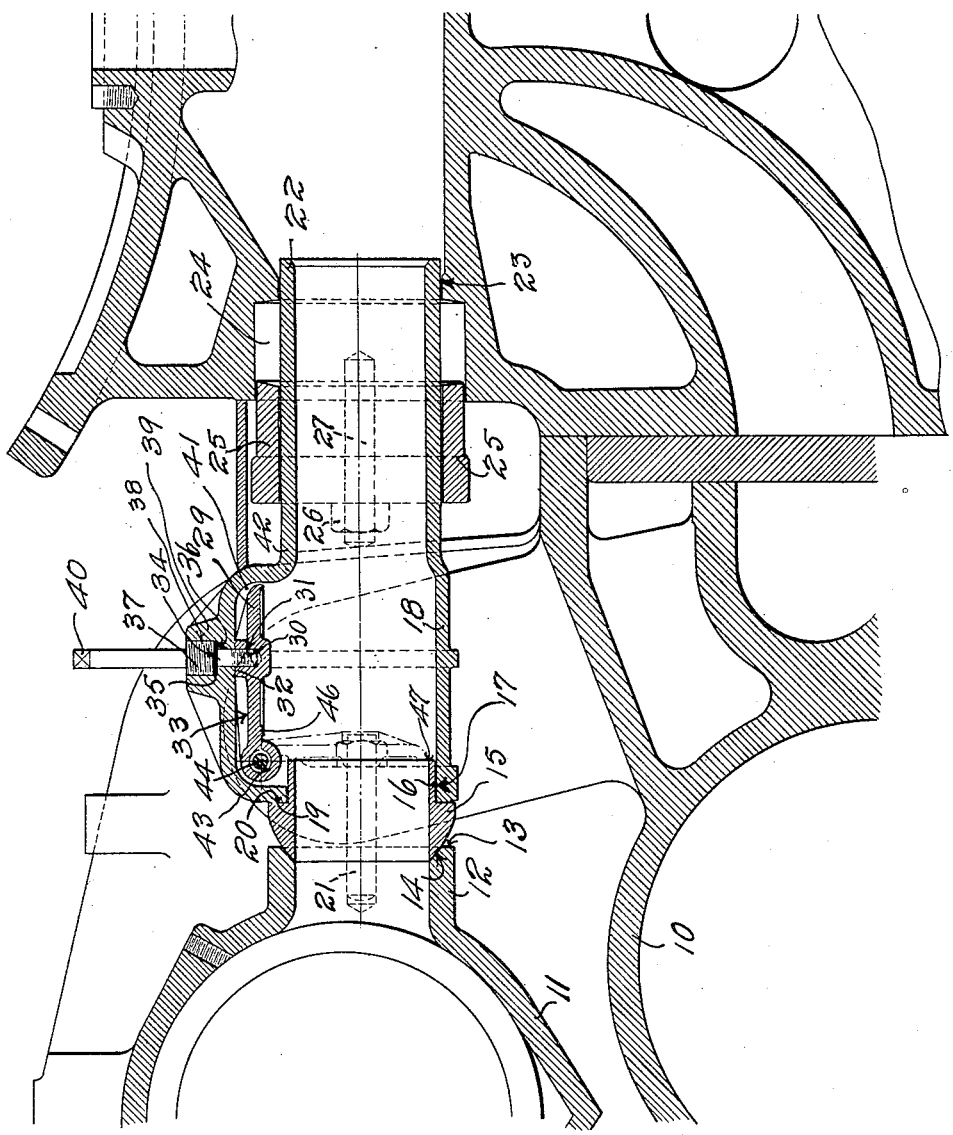
WITNESSES
W. Katzin.
Percy Hauser
INVENTOR
Harry A. Hoke
By N E Gee, His Attorney

UNITED STATES PATENT OFFICE.

HARRY A. HOKE, OF ALTOONA, PENNSYLVANIA.

LOCOMOTIVE GATE-VALVE BETWEEN CYLINDER AND SADDLE.

1,050,024.  Specification of Letters Patent.  Patented Jan. 7, 1913.

Application filed November 10, 1911. Serial No. 659,610.

*To all whom it may concern:*

Be it known that I, HARRY A. HOKE, a citizen of the United States, residing at Altoona, in the county of Blair and State of Pennsylvania, have invented certain new and useful Improvements in Locomotive Gate-Valves Between Cylinders and Saddles, of which the following is a specification.

This invention relates to an improved valve attachment or fitting for locomotive steam pipes, the same being especially designed to be employed in the steam pipe connection between the valve casing and cylinder saddle of a locomotive engine, and adapted to provide simple and practical means for effectively cutting off the steam supply from a disabled valve motion at one side of the locomotive, thus permitting the locomotive to be operated with one cylinder and one valve so that the engineer can proceed.

With this and other objects in view, which will be more readily apparent, as the nature of the invention is better understood, the same consists of the novel construction, combination and arrangement of parts as will hereinafter be fully pointed out, illustrated and claimed.

The essential features involved in carrying out the object above indicated are susceptible to a wide range of structural modification, without departing from the spirit or scope of the invention, but a preferred and practical embodiment thereof is shown in the accompanying drawings, in which: The figure is a view showing the steam pipe between the cylinder and saddle, the steam pipe being fitted with my improved gravity flap valve, the various parts being shown in cross section.

Similar numerals refer to similar parts throughout the drawings.

The invention is particularly adapted to modern steam locomotives having a cylinder designated by the numeral 10, and having a valve casing 11 cast integral with the cylinder, said casing being provided with an inwardly projecting neck 12, the end 13 of which is preferably provided with a curved seat 14, adapted to be engaged by a ball joint 15. The joint 15, is provided with a neck 16 which engages in the opening 17 of the steam pipe 18, and is further provided with a shoulder 19, against which the outside end 20 of the steam pipe abuts, thus providing in a very practical manner the necessary means for positioning the ball joint 15, between the neck 12 and the steam pipe 18, the parts being held together in operative relation by the bolts 21, which are studded into the valve casing 11.

The innermost end 22, of the steam pipe 18, protrudes through the opening 23, in the cylinder saddle, the saddle being provided with a stuffing box 24, adapted to receive a packing gland 25, which is drawn into place through the use of the gland nut 26, on the stud 27, which is studded into the face of the cylinder saddle. It will thus be obvious that ample provision is made for conducting the live steam from the cylinder saddle to the valve of the locomotive, providing at the same time ample means for taking care of any movements between the cylinder and saddle without steam leakage.

When operating locomotives in road service, it often becomes necessary to cut one side of the locomotive out, due principally to valve and valve gear failures, making it necessary to operate the locomotive with one cylinder and one valve. When this condition arises I close the live steam passage between the cylinder saddle and the valve, through the operation of my improved gate or gravity flap valve, designated by the numeral 29. This valve is normally held in an open position by a tap bolt 30, which engages a threaded opening 31, in the boss 32, located on the back 33 of the valve. The bolt 30, is preferably provided with a shoulder 34, adapted to engage a copper washer 35, placed between the face 36 on the steam pipe body and the shoulder 34 on the locking bolt. The bolt 30 is further provided with a threaded portion 37, adapted to engage the threaded opening 38, in the boss 39, which is made integral with the steam pipe 18. The bolt 30 is further provided with a square portion 40, at its upper end, for the purpose of applying a wrench, with which the same is placed in position, as shown in the drawings.

In order to provide for the free passage of live steam from the boiler to the cylinders, I prefer to make a recess 41, in the top 42 of the steam pipe 18, such that the valve when open will not retard the flow of live steam and interfere with the work of the locomotive. In order that the valve may easily move to its closed position, when released by the bolt 30, I prefer to drill the opening 43 larger than the hinge pin 44. I also prefer to offset the hinge such that the center of gravity of the gate valve will lie outside a vertical center line drawn through the hinge; thus gravity acts in a very practical way to assist in keeping the gate valve closed. I also provide the face of the gate valve, with a lip 46 extending around the inside surface in such a manner as to engage the face 47 of the neck 16, when in a closed position. When it is desired to close the valve, a wrench is applied to the square top 40, and the locking bolt 30 is disengaged from the gate valve, after which it readily swings to a closed position. The bolt 30 is again screwed down in place until the copper washer is drawn against the shoulder 34, forming a steam tight joint.

Without further description and elaboration it is thought that the many advantages of the herein-described invention will be readily apparent, and what I claim and desire to secure by Letters Patent is;

1. A valve attachment for locomotive steam pipes comprising a pipe fitting having an interior valve seat, a swinging gate valve adapted to engage said seat to close the passageway through the pipe, a locking device having an interior separable connection with the gate valve and an exterior operating portion, and an exterior locking connection with the pipe fitting.

2. A valve attachment for locomotive steam pipes comprising a pipe fitting having an interior valve seat and a recess at right angles to the said seat, a gravity gate valve hinged from its upper edge and adapted to be housed within said recess, and a locking stem having an interior detachably threaded connection with the gate valve, an exterior operating portion, and an exterior threaded portion, the latter detachably engaging the pipe fitting upon the outside.

In testimony whereof I affix my signature in presence of two witnesses.

HARRY A. HOKE.

Witnesses:
N. E. GEE,
J. T. HANLON.

Copies of this patent may be obtained for five cents each, by addressing the "Commissioner of Patents, Washington, D. C."